United States Patent
Kawano et al.

(10) Patent No.: US 10,916,959 B2
(45) Date of Patent: Feb. 9, 2021

(54) SEMICONDUCTOR DEVICE INCLUDING A BOOST CIRCUIT FOR CONTROLLING SWITCHES IN A BATTERY PACK

(71) Applicant: RENESAS ELECTRONICS CORPORATION, Tokyo (JP)

(72) Inventors: Kohei Kawano, Tokyo (JP); Tsuyoshi Ota, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 182 days.

(21) Appl. No.: 16/193,641

(22) Filed: Nov. 16, 2018

(65) Prior Publication Data
US 2019/0199103 A1 Jun. 27, 2019

(30) Foreign Application Priority Data
Dec. 22, 2017 (JP) .................. 2017-246715

(51) Int. Cl.
*H02J 7/00* (2006.01)
*H02M 3/07* (2006.01)

(52) U.S. Cl.
CPC .......... *H02J 7/008* (2013.01); *H02J 7/00712* (2020.01); *H02J 7/00714* (2020.01); *H02J 7/007182* (2020.01); *H02M 3/07* (2013.01)

(58) Field of Classification Search
CPC .............. H02J 7/008; H02J 7/0063; H02J 7/00
USPC ........................................................ 320/134
See application file for complete search history.

(56) References Cited

U.S. PATENT DOCUMENTS

| | | | | |
|---|---|---|---|---|
| 5,200,644 A * | 4/1993 | Kobayashi | ............ | F25B 49/025 307/103 |
| 5,592,117 A * | 1/1997 | Nadd | .................... | H03K 17/063 327/374 |
| 6,992,463 B2 * | 1/2006 | Yoshio | .................. | H02J 7/0031 320/134 |
| 7,248,078 B2 * | 7/2007 | Mitsuda | ............. | H03K 17/0822 326/27 |
| 7,423,410 B2 * | 9/2008 | Yoshio | .................. | H02J 7/0072 320/134 |
| 7,595,608 B2 * | 9/2009 | Gangstoe | .............. | H02J 7/0029 320/128 |
| 7,605,568 B2 * | 10/2009 | Gangstoe | .............. | H02J 7/0069 320/137 |
| 7,646,169 B2 * | 1/2010 | Liu | ........................ | H02J 7/0029 320/127 |
| 7,990,108 B2 * | 8/2011 | Aas | ........................ | H02J 7/0031 320/134 |

(Continued)

FOREIGN PATENT DOCUMENTS

JP 2015-186293 A 10/2015

*Primary Examiner* — John T Trischler
(74) *Attorney, Agent, or Firm* — McDermott Will & Emery LLP (57) ABSTRACT

A semiconductor device capable of turning a discharge control transistor off faster while maintaining safety is provided. A control unit, in discharge stopping processing, turns a switching element on and executes a first discharge-stopping mode in which the gate voltage of the discharge control transistor is withdrawn via a load and, at a predetermined discharge-stopping mode switching timing, switches to a second discharge-stopping mode in which the gate voltage of the discharge control transistor is withdrawn directly to a low-voltage power source.

12 Claims, 8 Drawing Sheets

(56) References Cited

U.S. PATENT DOCUMENTS

| | | | | |
|---|---|---|---|---|
| 8,344,790 B2* | 1/2013 | Li | ............... | H02M 3/073 327/535 |
| 8,450,977 B2* | 5/2013 | Niculae | ............... | H02M 1/08 320/136 |
| 8,638,067 B2* | 1/2014 | Sato | ............... | H01M 10/48 320/134 |
| 8,890,483 B2* | 11/2014 | Nakatsuji | ............... | H01M 10/42 320/150 |
| 8,901,894 B2* | 12/2014 | Sato | ............... | H02J 7/0068 320/164 |
| 9,018,917 B2* | 4/2015 | Niculae | ............... | H02J 7/0068 320/136 |
| 9,024,412 B2* | 5/2015 | Tonomura | ............... | H01L 25/16 257/546 |
| 9,112,494 B2* | 8/2015 | Kartal | ............... | H03K 17/063 |
| 9,118,238 B2* | 8/2015 | Liu | ............... | H02M 3/07 |
| 9,270,128 B2* | 2/2016 | Tonomura | ............... | H01L 27/088 |
| 9,360,881 B2 | 6/2016 | Tokuda | | |
| 9,385,600 B2* | 7/2016 | Torres | ............... | H02M 3/07 |
| 9,573,540 B2* | 2/2017 | Kanzaki | ............... | H02H 7/18 |
| 9,667,083 B2* | 5/2017 | Sato | ............... | H02J 7/0047 |
| 9,742,207 B2* | 8/2017 | Tonomura | ............... | H01L 27/088 |
| 9,912,329 B2* | 3/2018 | Fukami | ............... | H03K 17/162 |
| 10,090,682 B2* | 10/2018 | Snyder | ............... | H01M 10/441 |
| 10,516,276 B2* | 12/2019 | Yamauchi | ............... | H02J 7/0031 |
| 10,594,149 B2* | 3/2020 | Sato | ............... | G01R 19/0092 |
| 10,608,628 B2* | 3/2020 | Ferianz | ............... | H03K 17/687 |
| 10,644,583 B2* | 5/2020 | Carpenter | ............... | H02M 1/088 |
| 2005/0127879 A1* | 6/2005 | Sato | ............... | H02J 7/0031 320/134 |
| 2005/0134230 A1* | 6/2005 | Sato | ............... | H01M 10/443 320/136 |
| 2005/0242779 A1* | 11/2005 | Yoshio | ............... | B60L 3/0046 320/134 |
| 2006/0038584 A1* | 2/2006 | Mitsuda | ............... | H03K 17/0822 326/33 |
| 2006/0050461 A1* | 3/2006 | Bolz | ............... | H03K 17/6874 361/103 |
| 2006/0255768 A1* | 11/2006 | Yoshio | ............... | H02J 7/0029 320/134 |
| 2007/0210755 A1* | 9/2007 | Gangstoe | ............... | H02J 7/0029 320/128 |
| 2007/0210757 A1* | 9/2007 | Gangstoe | ............... | H02J 7/0069 320/130 |
| 2008/0204964 A1* | 8/2008 | Huang | ............... | H01H 47/226 361/194 |
| 2008/0284383 A1* | 11/2008 | Aas | ............... | H02J 7/0031 320/164 |
| 2009/0128212 A1* | 5/2009 | Liu | ............... | H02M 3/07 327/291 |
| 2009/0160500 A1* | 6/2009 | Niculae | ............... | H02M 1/08 327/109 |
| 2011/0109376 A1* | 5/2011 | Li | ............... | H02M 3/073 327/536 |
| 2011/0248653 A1* | 10/2011 | Brotto | ............... | H05B 45/00 318/139 |
| 2012/0262122 A1* | 10/2012 | Sato | ............... | H02J 7/0031 320/128 |
| 2013/0026829 A1* | 1/2013 | Kartal | ............... | H03K 17/063 307/10.6 |
| 2013/0063093 A1* | 3/2013 | Sato | ............... | H01M 10/48 320/134 |
| 2014/0070319 A1* | 3/2014 | Tonomura | ............... | H01L 27/0255 257/355 |
| 2014/0125289 A1* | 5/2014 | Tonomura | ............... | G01R 19/00 320/134 |
| 2014/0184164 A1* | 7/2014 | Niculae | ............... | H03K 3/012 320/134 |
| 2014/0301005 A1* | 10/2014 | Genova | ............... | H02J 7/00 361/86 |
| 2015/0145497 A1* | 5/2015 | Torres | ............... | H02M 3/158 323/283 |
| 2015/0180257 A1* | 6/2015 | Snyder | ............... | H02J 7/0022 320/134 |
| 2015/0210232 A1* | 7/2015 | Kanzaki | ............... | H02H 7/18 701/36 |
| 2015/0214213 A1* | 7/2015 | Tonomura | ............... | H01L 23/34 257/356 |
| 2015/0270829 A1* | 9/2015 | Tokuda | ............... | H02M 3/07 327/111 |
| 2016/0149424 A1* | 5/2016 | Tonomura | ............... | G01R 31/382 320/134 |
| 2017/0264121 A1* | 9/2017 | Sato | ............... | H01M 10/48 |
| 2018/0152035 A1* | 5/2018 | Li | ............... | H02J 7/0031 |
| 2018/0183247 A1* | 6/2018 | Yamauchi | ............... | H02J 7/0031 |
| 2019/0140638 A1* | 5/2019 | Ferianz | ............... | H03K 17/145 |
| 2019/0288532 A1* | 9/2019 | Mattos | ............... | H02J 7/00 |
| 2019/0379272 A1* | 12/2019 | Carpenter | ............... | H02M 1/088 |
| 2019/0393707 A1* | 12/2019 | Hunter | ............... | H02J 7/0063 |
| 2020/0099229 A1* | 3/2020 | Jeong | ............... | H01M 10/44 |
| 2020/0203968 A1* | 6/2020 | Okabayashi | ............... | H02J 7/0031 |

* cited by examiner

FIG. 7

SEMICONDUCTOR DEVICE INCLUDING A BOOST CIRCUIT FOR CONTROLLING SWITCHES IN A BATTERY PACK

CROSS-REFERENCE TO RELATED APPLICATIONS

The disclosure of Japanese Patent Application No. 2017-246715 filed on Dec. 22, 2017 including the specification, drawings and abstract is incorporated herein by reference in its entirety.

BACKGROUND

The present invention relates to a semiconductor device.

Battery packs having chargeable/dischargeable battery cells are mounted in various devices (loads), for example, smartphones, PCs, power tools and back-up power sources for servers. Battery cell performance varies depending on devices in which battery cells are mounted and the voltages used by the battery cells to supply power to loads range, for example, from several volts to very high voltages such as tens of volts.

A battery pack includes a battery cell control circuit which controls turning on/off of a charge control transistor and a discharge control transistor. For example, when the charge control transistor is on, the gate of the charge control transistor is applied with a voltage generated by a boost circuit.

In Japanese Unexamined Patent Application Publication No. 2015-186293, a drive circuit which can reduce power consumption is disclosed. According to the above patent literature, the drive circuit (1) includes an output circuit (10) and the output circuit (10) includes output nodes (A) and (B) through which drive clock signals (CP1) and (CP2) for driving a charge pump circuit (30) are outputted to the charge pump circuit (30). The output circuit (10) generates the drive clock signal (CP1) and the drive clock signal (CP2) based on a first clock signal (CK1) and a second clock signal (CK2) whose voltage level does not vary during a period in which the voltage level of the first clock signal (CK1) varies. Also, in a period before the voltage levels of the drive clock signals (CP1) and (CP2) vary, the output circuit (10) keeps, based on the second clock signal (CK2), the output nodes (A) and (B) for the drive clock signals (CP1) and (CP2) in a high-impedance state.

Figure 1:
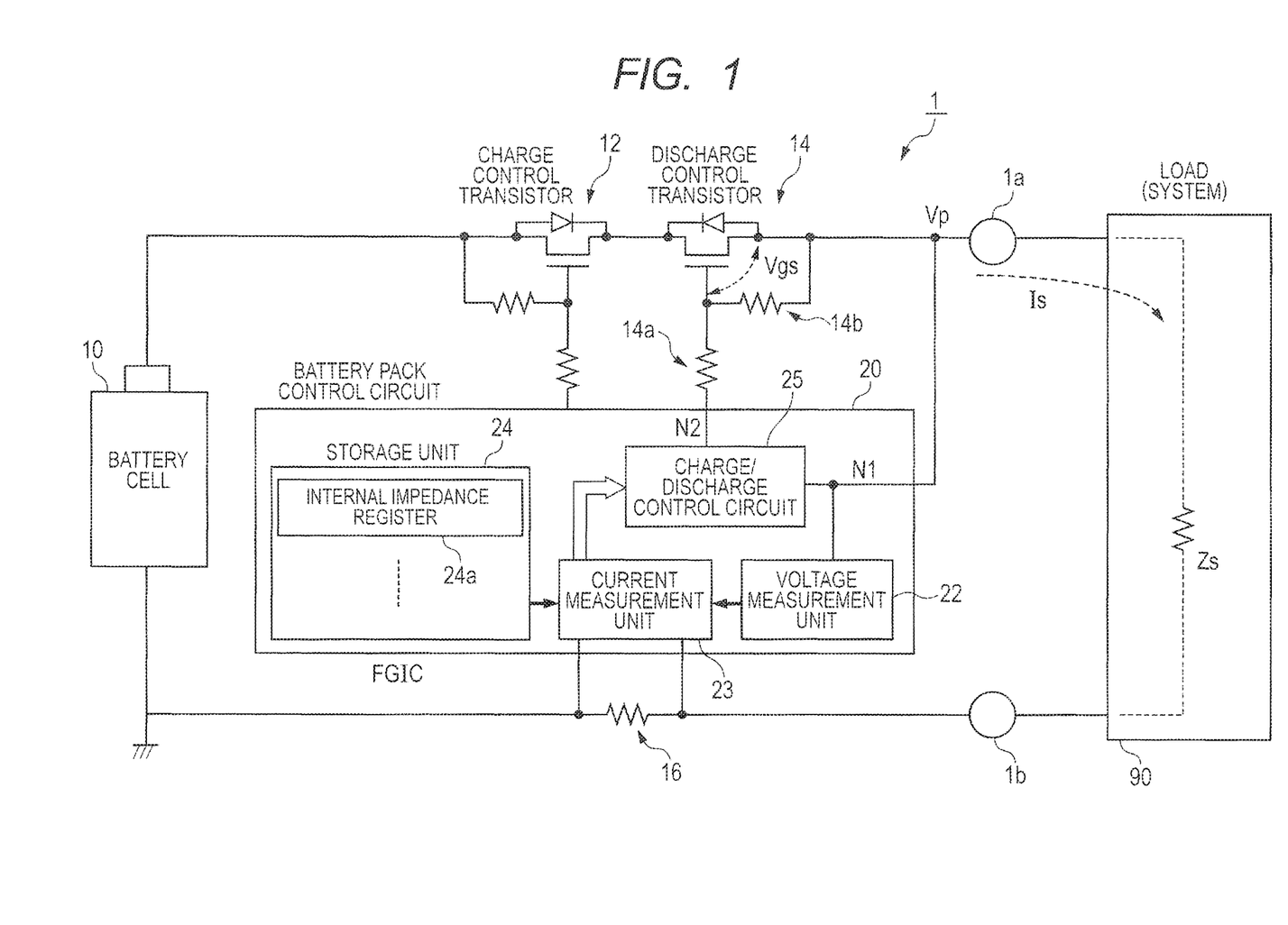
FIG. 1 is a circuit diagram showing an example battery pack configuration according to a first embodiment of the present invention.

The symbols shown parenthesized above represent symbols denoting constituent elements shown in FIG. 1 attached to the above patent literature. The drive circuit and the charge pump circuit mentioned above are circuits included in the foregoing battery cell control circuit and the charge pump circuit is a circuit corresponding to the foregoing boost circuit.

SUMMARY

A battery pack in use generates heat and possibly ignites, so that battery pack safety improvement is required. A main sources of heat generation in a battery pack is a charge/discharge path which includes a battery cell, a charge control transistor and a discharge control transistor.

Particularly, when the discharge control transistor is turned off, the on resistance increases and heat generation increases in the transistor. This causes the discharge control transistor to be subjected to a large load possibly breaking the element down.

When the discharge control transistor is turned off, the positive-side end of the battery pack serves as the source of the discharge control transistor and, when discharging is stopped, the voltage at the positive-side end of the battery pack also drops, so that the difference between the source voltage and the gate voltage of the discharge control transistor does not reduce in a short time. This slows down the turning off of the discharge control transistor.

Other objects and novel features of the present invention will become apparent from the following description and the attached drawings.

Among the semiconductor devices according to plural embodiments of the present invention described in this specification, the semiconductor device of one embodiment is described as follows. The semiconductor device controls charging and discharging of a battery cell included in a battery pack. The semiconductor device includes: a boost circuit with an input end coupled via a first node to a positive-side end of the battery pack and an output end coupled via a second node to the gate of a discharge control transistor; a switching element with one end coupled to the first node and another end coupled to the second node; a first switching element for voltage withdrawal with one end coupled to the second node and another end coupled to a low-voltage power source; and a control unit which is coupled to the gate of the switching element and to the gate of the first switching element for voltage withdrawal and which controls the gate voltage of the switching element and the gate voltage of the first switching element for voltage withdrawal. The first node is coupled to the source of the discharge control transistor.

In discharge stopping processing, the control unit turns the switching element on and executes a first discharge-stopping mode to withdraw the gate voltage of the discharge control transistor via a load and, at predetermined timing for switching the discharge-stopping mode, switches to a second discharge-stopping mode to withdraw the gate voltage directly to the low-voltage power source.

According to an embodiment of the present invention, a charge control transistor can be turned off faster while maintaining safety.

DETAILED DESCRIPTION

Embodiments of the present invention will be described in detail below with reference to drawings. In the drawings referred to in describing the embodiments, identical parts are, as a rule, denoted by identical numerals and symbols and, for such identical parts, descriptive duplication is avoided.

First Embodiment

<Battery Pack Configuration>

FIG. 1 is a circuit diagram showing an example battery pack configuration according to a first embodiment of the present invention. As shown in FIG. 1, a battery pack 1 includes a battery cell 10, a charge control transistor 12, a discharge control transistor 14, a current detection resistor 16 and a battery pack control circuit 20.

The battery pack 1 is a circuit block which is coupled to a load 90 via a positive-side end 1a and a negative-side end 1b and supplies a current to the load 90.

The battery cell 10 includes a secondary battery, for example, a lithium battery or a lithium-ion battery. The battery cell 10 may include one or more cells.

The charge control transistor 12 is a circuit element which mainly performs current control during charging of the battery cell 10. The charge control transistor 12 is made of, for example, a field-effect transistor such as an NMOS. The gate of the charge control transistor 12 is, as shown in FIG. 1, coupled to the battery pack control circuit 20. The charge control transistor 12 performs current control during charging/discharging of the battery cell 10 by having its gate voltage controlled from the battery pack control circuit 20.

The discharge control transistor 14 is a circuit element which performs current control during discharging of the battery cell 10, that is, when supplying current to the load 90. The discharge control transistor 14 is also made of a field-effect transistor such as an NMOS. The gate of the discharge control transistor 14 is also coupled, as shown in FIG. 1, to the battery pack control circuit 20. The discharge control transistor 14 also performs current control during charging/discharging of the battery cell 10 by having its gate voltage controlled from the battery pack control circuit 20.

The current detection resistor 16 is a circuit element which detects a load current flowing from the load 90. The current detection resistor 16 is coupled to the battery pack control circuit 20 and a load current Is is measured by a current measurement unit 23, being described later, included in the battery pack control circuit 20.

The battery pack control circuit 20 includes, as shown in FIG. 1, a voltage measurement unit 22, a current measurement unit 23, a storage unit 24 and a charge/discharge control circuit 25.

The voltage measurement unit 22 is a circuit block which measures an end voltage Vp at the positive-side end 1a of the battery pack 1. The voltage measurement unit 22 includes a voltage measurement circuit and an AD converter. In the voltage measurement unit 22, the end voltage Vp at the positive-side end 1a measured by the voltage measurement circuit is converted, at the AD converter, into a digital signal. The digital signal is then supplied to a control unit 37 either via the current measurement unit 23 or directly without passing the current measurement unit 23.

The current measurement unit 23 is a circuit block which measures the load current flowing from the load 90 through the current detection resistor 16. The current measurement unit 23 includes a current measurement circuit and an AD converter. In the current measurement unit 23, the load current measured at the current measurement circuit is converted into a digital signal at the AD converter. The digital signal is then supplied to the control unit 37. The current measurement circuit may be, for example, either a current integration circuit or an overcurrent detection circuit.

The storage unit 24 is a circuit block which stores various information related with the battery pack 1. The storage unit 24 includes a non-volatile memory, for example, a flash memory or an EEPROM.

The storage unit 24 includes, as shown in FIG. 1, an internal impedance register 24a which stores the value of internal impedance of the load 90. The internal impedance value is used in calculating a load voltage being described later.

The internal impedance register 24a may store the internal impedance values of plural loads. When storing the internal impedance values of plural loads, the internal impedance register 24a keeps correspondence between the internal impedance values and the loads. The storage unit 24 also includes registers for storing various information other than the internal impedance values.

The charge/discharge control circuit 25 is a circuit block which controls the current during charging/discharging of the battery cell 10. To be specific, the charge/discharge control circuit 25 controls the current during charging/discharging of the battery cell 10 by controlling the gate voltages of the charge control transistor 12 and the discharge control transistor 14.

Figure 2:
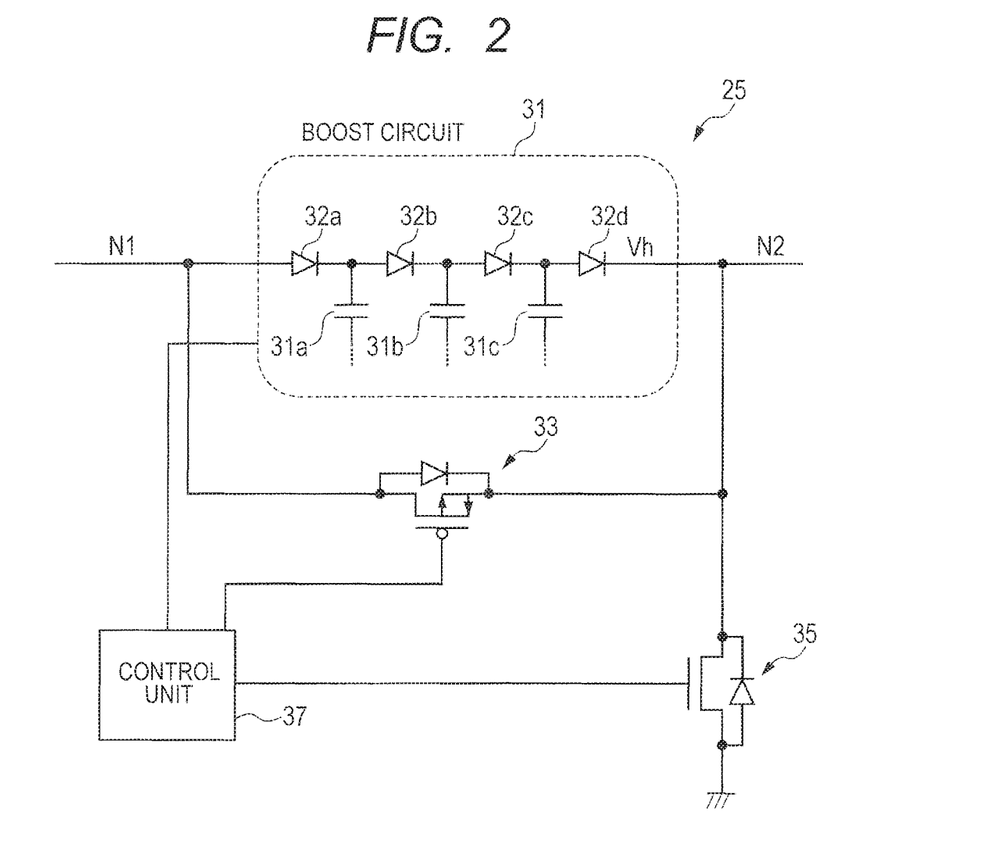
FIG. 2 is a circuit diagram illustrating an example configuration of a charge/discharge control circuit.

FIG. 2 is a circuit diagram illustrating an example configuration of the charge/discharge control circuit 25. The charge/discharge control circuit 25 includes, as shown in FIG. 2, a boost circuit 31, a switching element 33, a switching element (a first switching element for voltage withdrawal) 35 and a control unit 37.

The boost circuit 31 is a circuit block which generates voltage to be supplied to the gate of the discharge control transistor 14 during charging/discharging of the battery cell 10. An input-side end of the boost circuit 31 is coupled to a node (a first node) N1. An output-side end of the boost circuit 31 is coupled to the gate of the discharge control transistor 14 via a node (a second node) N2 and the resistor element 14a.

The boost circuit 31 includes, as shown in FIG. 2, capacitors 31a to 31c and diode elements 32a to 32d. The diode elements 32a to 32d are coupled in series between the nodes N1 and N2. A first electrode of the capacitor 31a is coupled to the cathode of the diode element 32a and the anode of the diode element 32b. A first electrode of the capacitor 31b is coupled to the cathode of the diode element 32b and the anode of the diode element 32c. A first electrode of the capacitor 31c is coupled to the cathode of the diode element 32c and the anode of the diode element 32d. The second electrode of each of the capacitors 31a to 31c is coupled to the control unit 37. The boost circuit 31 generates a predetermined voltage under the control of the control unit 37 and supplies the voltage generated to the gate of the discharge control transistor 14.

The switching element 33 is a circuit element which short-circuits the nodes N1 and N2 when stopping discharging of the battery cell 10. The switching element 33 includes a field-effect transistor such as a PMOS. One end of the switching element 33 is coupled to the node N1. The other end of the switching element 33 is coupled to the node N2. The gate of the switching element 33 is coupled to the control unit 37. The switching element 33 is turned on/off by having its gate voltage controlled by the control unit 37.

The switching element 35 is a circuit element which, when stopping discharging of the battery cell 10, withdraws the voltage at the node N2, that is, the gate voltage of the discharge control transistor 14 at predetermined timing (timing for switching the discharge-stopping mode). One end of the switching element 35 is coupled to the node N2. The other end of the switching element 35 is coupled to a low-voltage power source (e.g., GND). The gate of the switching element 35 is coupled to the control unit 37. The switching element 35 is turned on/off by having its gate voltage controlled by the control unit 37.

The control unit 37 is a circuit which controls various operations performed in the charge/discharge control circuit 25. The control unit 37 is coupled to circuits included in the charge/discharge control circuit 25 and also to the current measurement unit 23. For example, the control unit 37 controls the current flowing during charging/discharging of the battery cell 10 by controlling the gate voltages of the charge control transistor 12 and the discharge control transistor 14. The process for stopping discharging of the battery cell 10, in particular, will be described in detail later.

The resistive elements 14a and 14b are circuit elements which adjust the gate voltage and the end voltage on the positive-side end 1a side of the discharge control transistor 14. The resistive element 14a is positioned between the node N2 and the gate of the discharge control transistor 14. The resistive element 14b is positioned between the gate of the discharge control transistor 14 and the end on the positive-side end 1a side of the discharge control transistor 14.

The resistive elements 14a and 14b divide, based on their respective resistance values R1 and R2, a high voltage Vh supplied from the boost circuit 31. Therefore, the gate of the discharge control transistor 14 is supplied with a predetermined voltage generated by voltage division by the resistive elements 14a and 14b.

<Discharge Stopping Processing>

Figure 3:
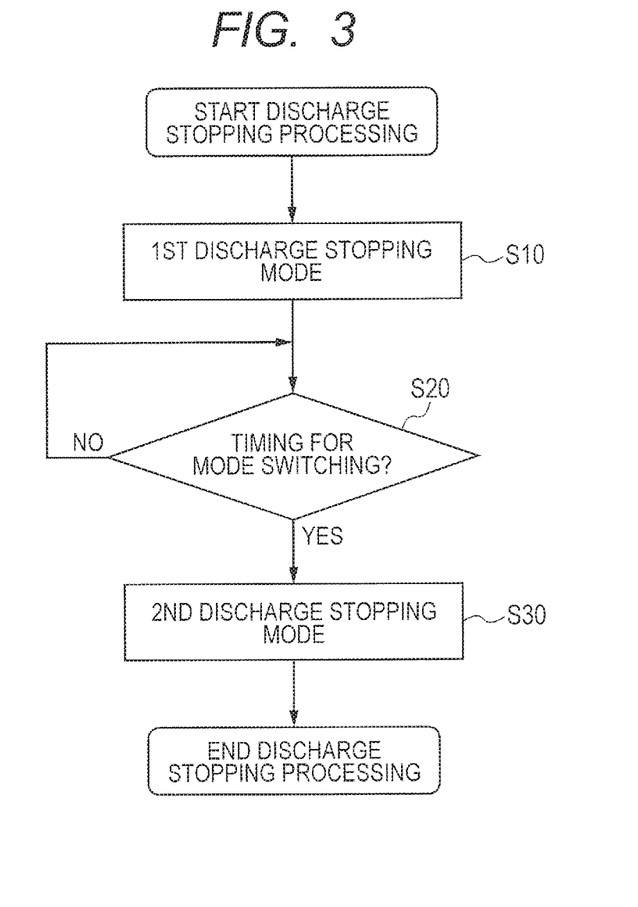
FIG. 3 is a flowchart for discharge stopping processing according to the first embodiment.

Next, the processing for stopping discharging of the battery cell 10 will be described. FIG. 3 is a flowchart for the discharge stopping processing according to the first embodiment. In the discharge stopping processing according to the present embodiment, steps S10 to S30 shown in FIG. 3 are performed.

[Step S10]

In step S10, the gate voltage of the discharge control transistor 14 is withdrawn via the load 90. In the following, the processing performed in step S10 will be described in detail. The processing performed in step S10 will be referred to as a first discharge-stopping mode.

The control unit 37, by controlling the voltage supplied to the second electrode of each of the capacitors 31a to 31c, stops the supply of a high voltage (high-level voltage) Vh from the boost circuit 31 to the gate of the discharge control transistor 14.

Also, the control unit 37, by supplying a low-level voltage to the gate of the switching element 33, turns the switching element 33 on. This short-circuits the nodes N1 and N2 via the switching element 33. As a result, the gate voltage of the discharge control transistor 14 is withdrawn to a low-voltage power source (e.g., GND) via the load 90 and the current detection resistor 16.

Figure 4A:
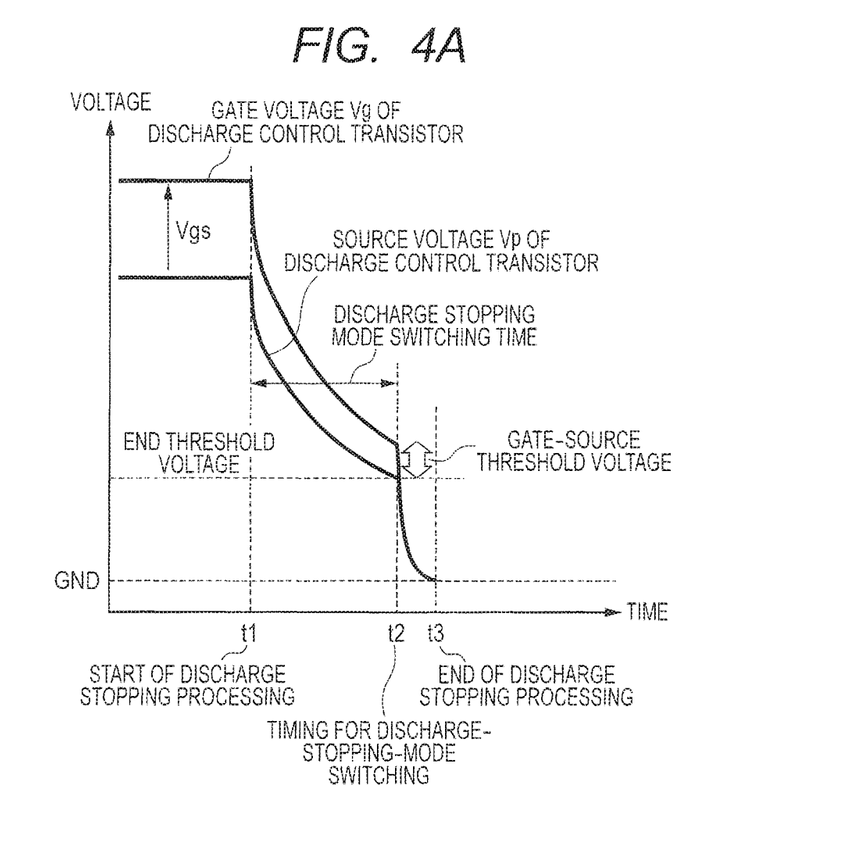
FIGS. 4A and 4B are drawings both illustrating the operation of a discharge control transistor performed when stopping discharging of a battery cell.
Figure 4B:
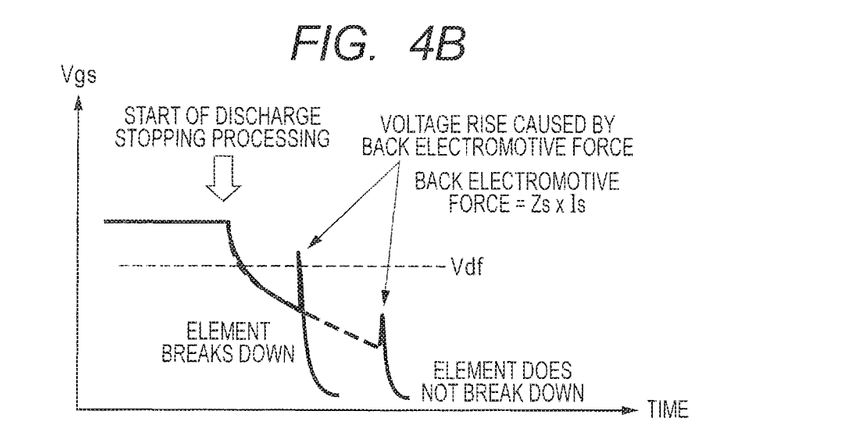

FIGS. 4A and 4B are drawings illustrating the operation of the discharge control transistor 14 performed when stopping discharging of the battery cell 10. FIG. 4A is a timing chart of the gate voltage Vg and the source voltage Vp of the discharge control transistor 14. FIG. 4B illustrates gate-source voltage Vgs (=|Vg−Vp|) that is the voltage difference between the gate voltage Vg and the source voltage Vp of the discharge control transistor 14 when the switching element 35 is turned on in the first discharge-stopping mode.

When, at time t1, the high-voltage supply to the gate of the discharge control transistor 14 is stopped, the gate voltage Vg and source voltage Vp of the discharge control transistor 14 drop. However, for some time after time t1, the voltage difference between the gate voltage Vg and the source voltage Vp remains large. In this state, the discharge control transistor 14 is not completely off with minute discharging continuing.

When, in the above state, the switching element 35 is turned on, the voltages at the nodes N1 and N2 are withdrawn causing a back electromotive force to be generated. As a result, the voltage at the positive-side end 1a of the battery pack 1, i.e., the source voltage Vp of the discharge control transistor 14 temporarily and sharply rises. For example, as shown in FIG. 4B, turning the switching element 35 on in a period between time t1 and time t2 when the gate-source voltage Vgs is high causes a back electromotive force to be generated and the source voltage Vp to sharply and temporarily rise. As a result, the gate-source voltage Vgs exceeds the element breakdown voltage Vdf and causes the discharge control transistor 14 to break down. To prevent this, in the first discharge-stopping mode, the control unit 37 turns the switching element 35 off.

At this time, the voltage measurement unit 22 measures the end voltage Vp at the positive-side end of the battery pack 1, that is, the source voltage Vp of the discharge control transistor 14. Also, the current measurement unit 23 measures the load current Is flowing through the current detection resistor 16 and supplies the measured value of the load current Is to the control unit 37.

Also, the internal impedance register 24a supplies, either via the current measurement unit 23 or directly, the value of internal impedance Zs of the load 90 coupled to the battery pack 1 to the control unit 37. The value of internal impedance Zs may be supplied to the control unit 37 when starting the discharge stopping processing or at predetermined timing after the load 90 is recognized by the battery pack 1.

[Step S20]

In step S20, whether the timing for discharge stopping has arrived is determined.

The control unit 37 calculates the load voltage Vs (=Zs× Is) based on the load current measured in step S10 and the internal impedance Zs of the load 90. The control unit 37 then calculates, by totaling the source voltage (end voltage) Vp and the load voltage Vs, a discharge-stopping mode determination voltage Vjud (=Vp+Zs×Is). The discharge-stopping mode determination voltage Vjud may alternatively be calculated in step S10.

The control unit 37 compares the discharge-stopping mode determination voltage Vjud calculated and the element breakdown voltage Vdf and, when the discharge-stopping mode determination voltage Vjud is higher than the element breakdown voltage Vdf (No), continues execution of the first discharge-stopping mode.

When the discharge-stopping mode determination voltage Vjud is lower than the element breakdown voltage Vdf (Yes), the control unit 37 determines that the timing for switching the discharge-stopping mode has arrived. To be specific, as shown in FIG. 4B, at time t13 when the gate-source voltage Vgs has dropped, the back electromotive force, if generated, does not cause the gate-source voltage Vgs to exceed the element breakdown voltage Vdf. Therefore, switching the discharge-stopping mode does not cause the discharge control transistor 14 to break down.

In the first discharge-stopping mode, the control unit 37 may perform the processing of step S20 for timing determination either continuously repeatedly or at predetermined intervals. Continuously repeatedly performing the determination processing makes it possible to switch the discharge-stopping mode at appropriate timing corresponding to when the discharge-stopping mode determination voltage Vjud drops below the element breakdown voltage Vdf. Hence, the discharge control transistor 14 can be securely turned off in a short period of time. Performing the determination processing at predetermined intervals, on the other hand, makes it possible to turn the discharge control transistor 14 off in a short period of time while reducing the burden on the control unit 37.

[Step S30]

In step S30, the gate voltage of the discharge control transistor 14 is directly withdrawn by a low-voltage power source. The processing performed in step S30 will be referred to as a second discharge-stopping mode.

The control unit 37 turns the switching element 35 on by supplying a low-level voltage to the gate of the switching element 35. This short-circuits the node N2 and the low-voltage power source (GND) via the switching element 35. As a result, the voltages at the nodes N1 and N2 and the gate voltage of the discharge control transistor 14 are rapidly withdrawn.

For example, at time t2 when the gate voltage Vg and the source voltage Vp have dropped to be lower than at time t1 as shown in FIG. 4A, the control unit 37 turns the switching element 35 on. This causes the gate voltage Vg and the source voltage Vp of the discharge control transistor 14 to be rapidly withdrawn in a short period of time from time t2 to time t3. As a result, the gate-source voltage Vgs of the discharge control transistor 14 becomes 0 and the discharge control transistor 14 is turned off. Minute discharging also stops.

In the second discharge-stopping mode, the switching element 33 is also preferably kept on. In this way, the gate voltage Vg can be withdrawn faster by means of voltage withdrawal via the switching element 33 and the load 90 and also via the switching element 35. Also, since the voltage difference between the nodes N1 and N2 due to turning on of the switching element 35 is suppressed, rising of the gate-source voltage Vgs of the discharge control transistor 14 is suppressed. This inhibits breakdown of the discharge control transistor 14.

Main Effects of the Present Embodiment

According to the present embodiment, in the discharge stopping processing, the control unit 37 continues execution of the first discharge-stopping mode when the discharge-stopping mode determination voltage Vjud is higher than the element breakdown voltage Vdf and switches from the first discharge-stopping mode to the second discharge-stopping mode when the discharge-stopping mode determination voltage Vjud is lower than the element breakdown voltage Vdf. In this way, switching to the second discharge-stopping mode does not cause the discharge control transistor 14 to break down, so that the discharge control transistor 14 can be turned off faster while maintaining safety.

Also, according to the present embodiment, the value of internal impedance Zs of the load 90 to be coupled to the battery pack 1 is stored in advance in the internal impedance register 24a. In this way, the internal impedance Zs of the load 90 need not be read in from outside during operation, so that the discharge stopping processing can be simplified.

Also, according to the present embodiment, the values of plural internal impedances corresponding to plural loads are stored. In this way, the internal impedance Zs corresponding to the load 90 coupled to the battery pack 1 can be selected from the stored values, so that the versatility of the battery pack 1 is improved.

Second Embodiment

Next, a second embodiment of the present invention will be described. In the first embodiment, the end voltage Vp and the load voltage Vs are measured and the timing for switching the discharge-stopping mode is determined based on the measurements. However, after the discharge stopping processing is started, the waveforms of the gate voltage Vg and source voltage (end voltage) Vp of the discharge control transistor 14 depend on the characteristics of the load 90 coupled to the battery pack 1. This follows that the timing for switching the discharge-stopping mode can be, to a certain degree, predicted for each load 90. In the following, determining the timing for switching the discharge-stopping mode based on a time period will be described as the second embodiment.

Figure 5:
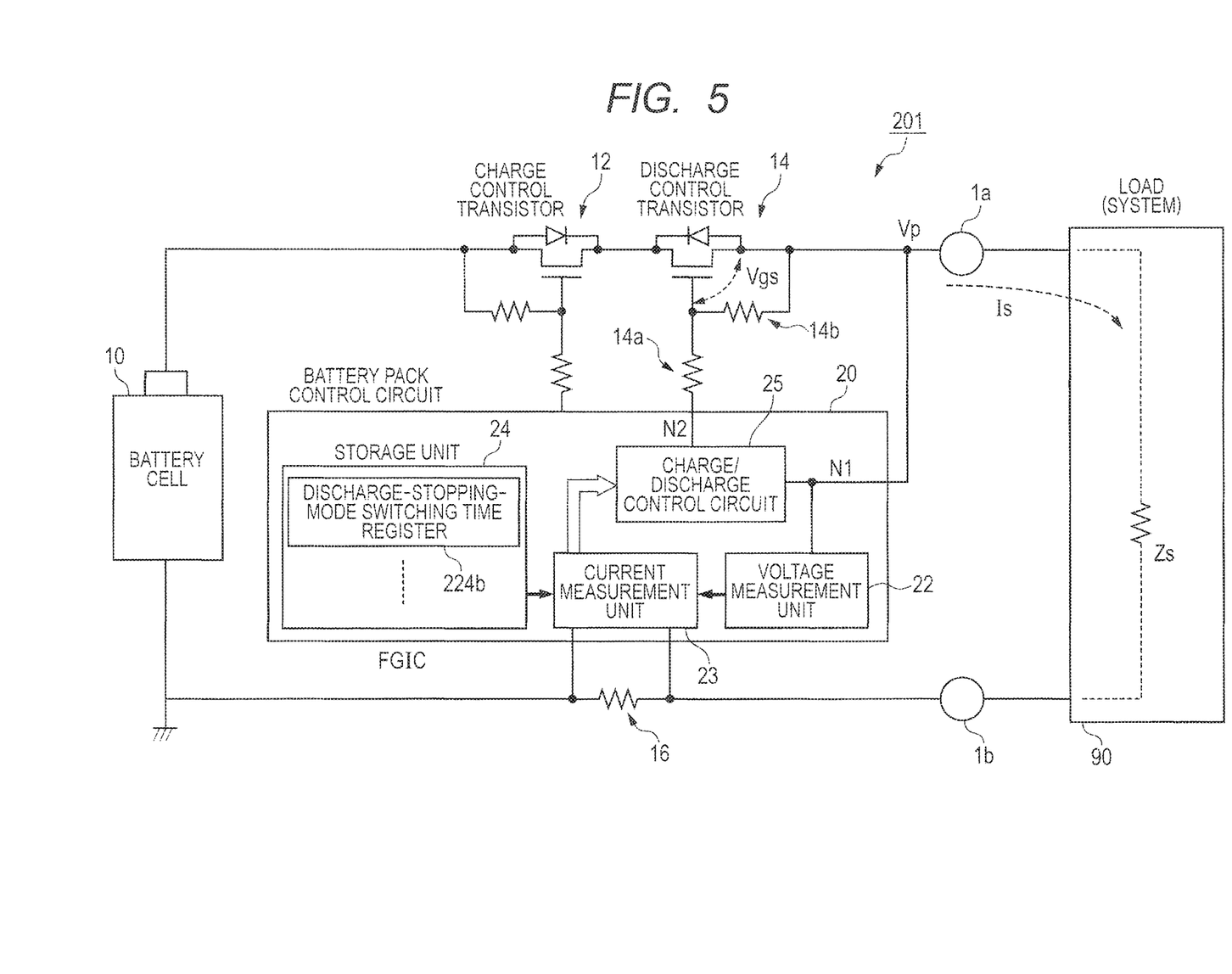
FIG. 5 is a circuit diagram showing an example battery pack configuration according to a second embodiment of the present invention.

FIG. 5 is a circuit diagram showing an example battery pack configuration according to the second embodiment of the present invention. As shown in FIG. 5, a battery pack 201 according to the second embodiment is identical to the battery pack 1 shown in FIG. 1 except that the storage unit 24 is added with a discharge-stopping mode switching time register 224b.

The discharge-stopping mode switching time register 224b stores a discharge-stopping mode switching time representing a period of time to elapse from when the first discharge-stopping mode is started until when the end voltage Vp at the positive-side end 1a of the battery pack 1 becomes lower than a predetermined end threshold voltage Vtp.

The end threshold voltage Vtp is specified, for example, by the end voltage at the time when the discharge-stopping mode determination voltage Vjud equals the element breakdown voltage Vdf (Vjud=Vdf). Also, the discharge-stopping mode switching time to be stored in the discharge-stopping mode switching time register 224b is a time period value which has been set based on test results and is stored before shipment. Also, the discharge-stopping mode switching time register 224b may store plural time period values for switching the discharge-stopping mode corresponding to plural loads.

<Discharge Stopping Processing>

The discharge stopping processing according to the second embodiment will be described below with reference, again, to the flowchart shown in FIG. 3. In the following, the description of step S30 shown in FIG. 3 being identical to the description given in connection with the first embodiment will be omitted. As for step S10, only aspects differing from step S10 according to the first embodiment will be described.

[Step S10]

The control unit 37 measures the execution time of the first discharge-stopping mode from when the first discharge-stopping mode is started. For example, the control unit 37 may measure the execution time of the first discharge-stopping mode using a timer or may measure the first discharge-stopping mode execution time based on a count obtained by counting made using a counter from when the first discharge-stopping mode is started.

[Step S20]

The control unit 37 compares the value of time period for switching the discharge-stopping mode supplied from the discharge-stopping mode switching time register 224b and the execution time of the first discharge-stopping mode measured as described above. When the execution time of the first discharge-stopping mode is shorter than the time period for switching the discharge-stopping mode (No), the control unit 37 continues execution of the first discharge-stopping mode.

When the execution time of the first discharge-stopping mode is longer than the time period for switching the discharge-stopping mode (Yes), the control unit 37 determines that the timing for switching the discharge-stopping mode has arrived and switches to the second discharge-stopping mode.

Main Effects of the Second Embodiment

According to the second embodiment, the following effects can be obtained in addition to the effects described in connection with the first embodiment. In the present embodiment, the control unit 37 determines the timing for switching the discharge-stopping mode by comparing the measured execution time of the first discharge-stopping mode and a predetermined time period for switching the discharge-stopping mode. In this way, the discharge stopping processing is simplified, so that the burden on the control unit 37 is reduced.

Also, according to the present embodiment, a time period value for switching the discharge-stopping mode is stored in the discharge-stopping mode switching time register 224b and the control unit 37 determines the timing for switching the discharge-stopping mode based on the time period value for switching the discharge-stopping mode stored in the discharge-stopping mode switching time register 224b. In this way, the time period value for switching the discharge-stopping mode need not be read in from outside during operation, so that the discharge stopping processing is simplified.

Third Embodiment

Next, a third embodiment of the present invention will be described. As described above, the waveforms of the gate voltage Vg and source voltage Vp of the discharge control transistor 14 after the discharge stopping processing is started depend on the characteristics of the load 90 coupled to the battery pack 1. This follows that the timing for switching the discharge-stopping mode can be, to a certain degree, predicted for each load 90. In the following, determining the timing for switching the discharge-stopping mode based on the gate-source voltage Vgs of the discharge control transistor 14 will be described as the third embodiment.

Figure 6:
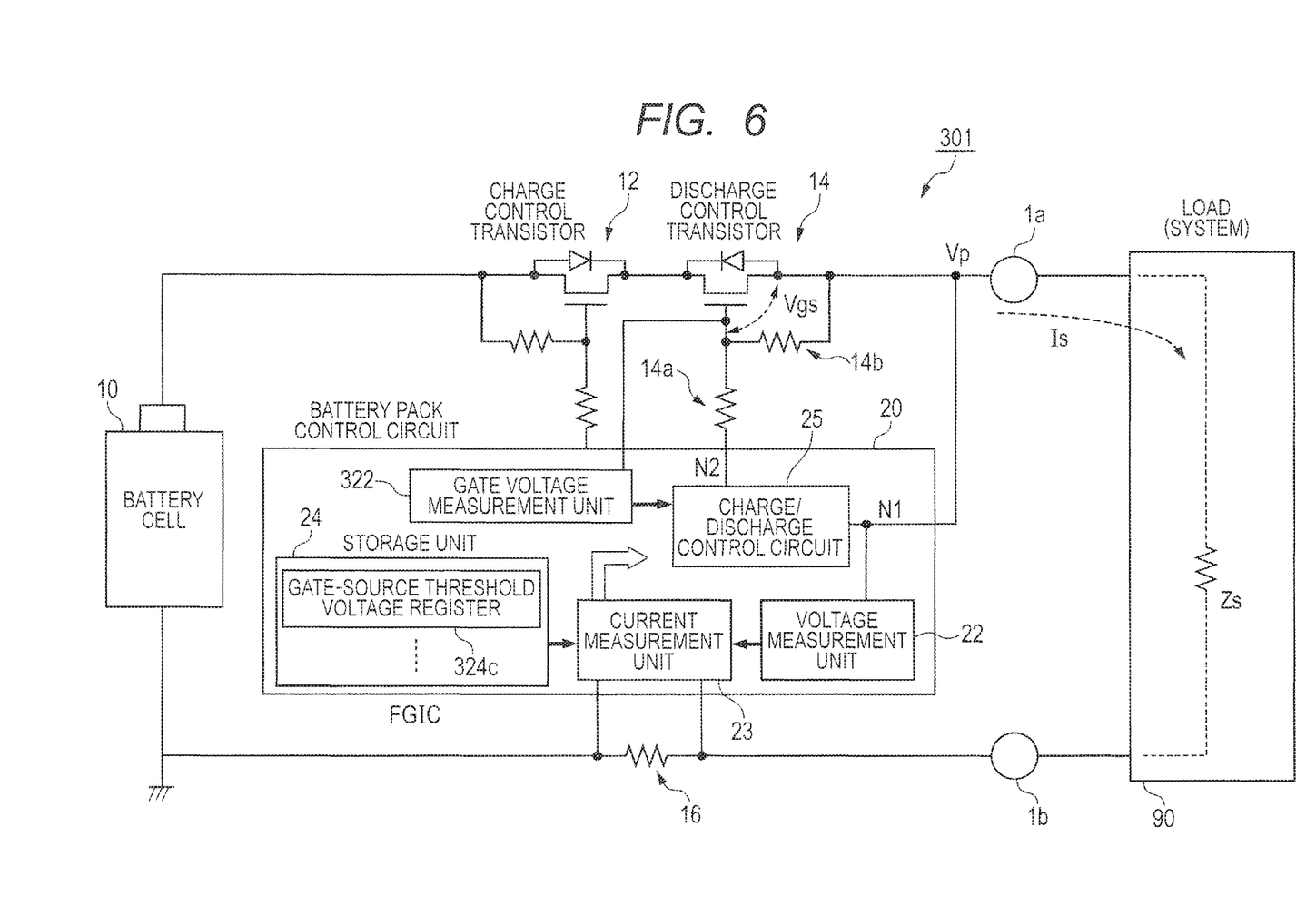
FIG. 6 is a circuit diagram showing an example battery pack configuration according to a third embodiment of the present invention.

FIG. 6 is a circuit diagram showing an example battery pack configuration according to the third embodiment of the present invention. As shown in FIG. 6, a battery pack 301 according to the third embodiment is equivalent to the battery pack 1 shown in FIG. 1 except that the storage unit 24 is added with a gate-source threshold voltage register 324c. The gate-source threshold voltage register 324c stores a value of gate-source voltage Vgs of the discharge control transistor 14 as a gate-source threshold voltage (a first gate-source threshold voltage) for determining that the timing for switching the discharge-stopping mode has arrived.

Also, the gate-source threshold voltage value to be stored in the gate-source threshold voltage register 324c is a voltage value set based on test results and is stored before shipment. Also, the gate-source threshold voltage register 324c may store plural gate-source threshold voltage values corresponding to plural loads.

In the battery pack 301 compared with the battery pack 1 shown in FIG. 1, the battery pack control circuit 20 additionally includes a gate voltage measurement unit 322. The gate voltage measurement unit 322 measures the gate voltage Vg of the discharge control transistor 14. The gate voltage measurement unit 322 is configured similarly to the voltage measurement unit 22. The gate voltage measurement unit 322 may be included in the charge/discharge control circuit 25.

<Discharge Stopping Processing>

The discharge stopping processing according to the third embodiment will be described below with reference, again, to the flowchart shown in FIG. 3. In the following, the description of step S30 shown in FIG. 3 being identical to the description given in connection with the first embodiment will be omitted. As for step S10, only aspects differing from step S10 according to the first embodiment will be described.

[Step S10]

The gate voltage measurement unit 322 measures the gate voltage Vg of the discharge control transistor 14 and supplies the measurement to the control unit 37. The voltage measurement unit 22 measures the end voltage Vp at the positive-side end 1a of the battery pack 1 as the source voltage Vs of the discharge control transistor 14 and supplies the measurement to the control unit 37. The control unit 37 measures the gate-source voltage Vgs of the discharge control transistor 14 based on the gate voltage Vg of the discharge control transistor 14 measured by the gate voltage measurement unit 322 and the source voltage Vs measured by the voltage measurement unit 22. The processing concerning the measurement of the gate-source voltage Vgs may be performed in step S20.

[Step S20]

The control unit 37 compares the gate-source threshold voltage value supplied from the gate-source threshold voltage register 324c and the gate-source voltage Vgs measured. When the gate source voltage Vgs is higher than the gate-source threshold voltage (No), the control unit 37 continues execution of the first discharge-stopping mode.

When the gate source voltage Vgs is lower than the gate-source threshold voltage (Yes), the control unit 37 determines that the timing for switching the discharge-stopping mode has arrived and switches to the second discharge-stopping mode.

Main Effects of the Third Embodiment

According to the third embodiment, the following effects can be obtained in addition to the effects described in connection with the foregoing embodiments. In the present embodiment, the timing for switching the discharge-stopping mode is determined by comparing the gate-source voltage Vgs of the discharge control transistor 14 and the gate-source threshold voltage. In this way, the discharge stopping processing is simplified, so that the burden on the control unit 37 is reduced.

According to the present embodiment, a gate-source threshold voltage value is stored in the gate-source threshold voltage register 324c and the control unit 37 determines the timing for switching the discharge-stopping mode based on the gate-source threshold voltage value stored in the gate-source threshold voltage register 324c. In this way, the gate-source threshold voltage value need not be read in from outside during operation, so that the discharge stopping processing is simplified.

Fourth Embodiment

Next, a fourth embodiment of the present invention will be described. In the foregoing embodiments, at the timing for switching the discharge-stopping mode, the switching element 35 is turned on and, thereby, the gate voltage of the discharge control transistor 14 is rapidly withdrawn. In the present fourth embodiment compared with the foregoing embodiments, withdrawal of the gate voltage of the discharge control transistor 14 is started in an earlier stage and is carried out little by little. This will be described in the following based on the battery pack 301 of the third embodiment.

Figure 7:
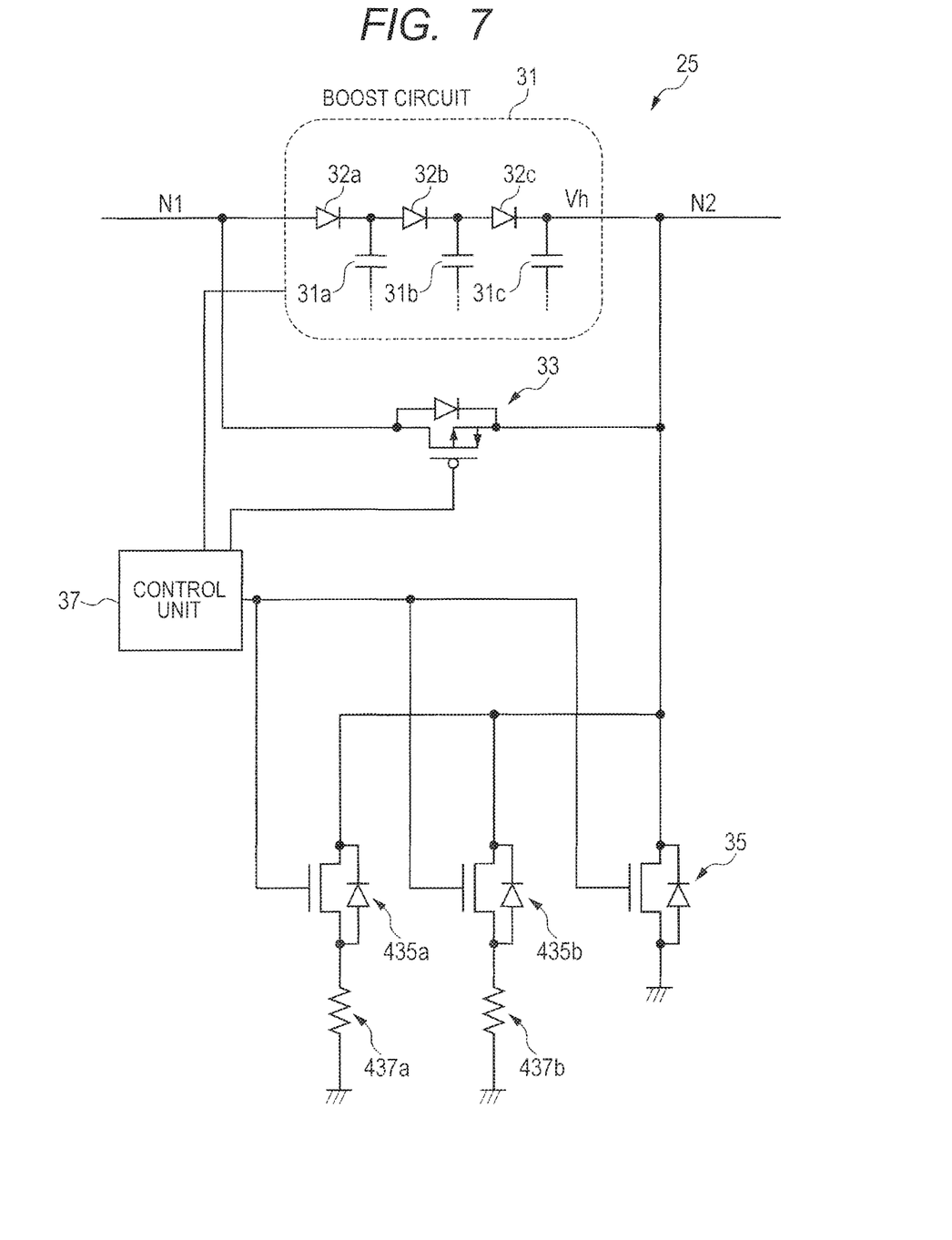
FIG. 7 is a circuit diagram showing an example configuration of a charge/discharge control circuit according to a fourth embodiment of the present invention.

FIG. 7 is a circuit diagram showing an example configuration of a charge/discharge control circuit according to the fourth embodiment. As shown in FIG. 7, the charge/discharge control circuit 25 of the present embodiment is equivalent to the charge/discharge control circuit 25 shown in FIG. 2 added with switching elements (second switching elements for voltage withdrawal) 435a and 435b and resistive elements (current adjusting resistive elements) 437a and 437b. As shown in FIG. 7, the resistive elements 437a and 437b are provided correspondingly to the switching elements 435a and 435b.

The switching elements 435a and 435b are circuit elements for starting, at predetermined timing in the second discharge-stopping mode, withdrawal of the gate voltage of the discharge control transistor 14. One end of each of the switching elements 435a and 435b is coupled to the node N2. The other ends of the switching elements 435a and 435b are respectively coupled to the ends on one side of the resistive elements 437a and 437b. The ends on the other side of the resistive elements 437a and 737b are coupled to a low-voltage power source (e.g., GND). The resistive elements 437a has a higher resistance than the resistive element 437b.

The gates of the switching elements 435a and 435b are coupled to the control unit 37. The switching elements 435a and 435b are turned on/off by having their gate voltages controlled by the control unit 37. In the present embodiment, the switching elements 435a, 435b and 35 are turned on at different timings according to the level of the gate-source voltage Vgs of the discharge control transistor 14.

Hence, the gate-source threshold voltage register 324c stores plural gate-source threshold voltage values (e.g., first to third gate-source threshold voltage values) for determining the timings for turning the switching elements 435a, 435b and 35 on.

To be specific, the switching element 435a turns on when the gate-source voltage of the discharge control transistor 14 is at high level (at the third gate-source threshold voltage). The switching element 435b turns on at a gate-source voltage (at the second gate-source threshold voltage) lower than the gate-source voltage at which the switching element 435a turns on. The switching element 35 turns on at a gate-source voltage (at the first gate-source threshold voltage) lower than the gate-source voltage at which the switching element 435b turns on.

Alternative Configurations

The above configuration includes two second switching elements for voltage withdrawal each coupled with a resistive element, but the number of second switching elements for voltage withdrawal may be one or three or more.

The present embodiment can also be applied to the configurations of the first and second embodiments. In this case, the timing for turning the switching elements 435a, 435b and 35 may be determined based on the level of the discharge-stopping mode determination voltage Vjud and the level of the end voltage Vp.

<Discharge Stopping Processing>

Figure 8:
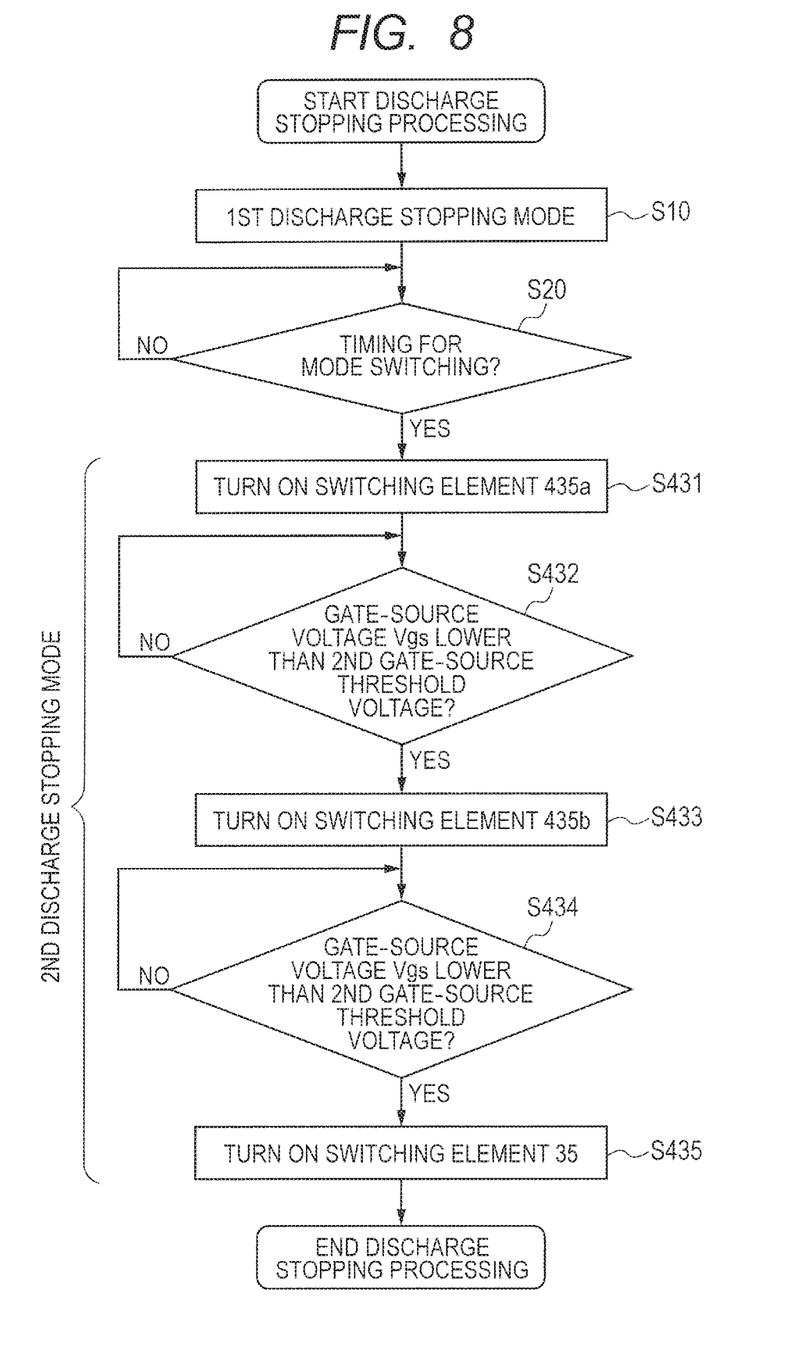
FIG. 8 is a flowchart for discharge stopping processing according to the fourth embodiment.

The discharge stopping processing according to the present embodiment will be described below. FIG. 8 is a flowchart for the discharge stopping processing according to the fourth embodiment. The description of step S10 being identical to step S10 of the third embodiment will be omitted in the following.

[Step S20]

The control unit 37 compares the third gate-source threshold voltage value supplied from the gate-source threshold voltage register 324c and the measured gate-source voltage Vgs. When the gate source voltage Vgs is higher than the third gate-source threshold voltage (No), the control unit 37 continues execution of the first discharge-stopping mode.

When the gate source voltage Vgs is lower than the third gate-source threshold voltage (Yes), the control unit 37 determines that the timing for switching the discharge-stopping mode has arrived and switches to the second discharge-stopping mode by turning the switching element 435a on.

[Step S431]

In step S431, the gate voltage of the discharge control transistor 14 is withdrawn via a switching element 435a and a resistive element 437a. The current flowing when the gate voltage is withdrawn is adjusted by the resistive element 437a so as not to cause the discharge control transistor 14 to break down. During this time, too, measurement of the gate-source voltage Vgs of the discharge control transistor 14 is performed.

[Step S432]

Next, the control unit 37 compares the second gate-source threshold voltage value supplied from the gate-source threshold voltage register 324c and the measured gate-source voltage Vgs. When the gate-source voltage Vgs is higher than the second gate-source threshold voltage (No), the control unit 37 continues execution of step S431. Namely, in this state, among the switching elements, only the switching element 435a is on. When the gate-source voltage Vgs is lower than the second gate-source threshold voltage (Yes), the control unit 37 turns the switching element 435b on.

[Step S433]

In step S433, the gate voltage of the discharge control transistor 14 is withdrawn also through a path via the switching element 435b and the resistive element 437b. The current flowing when the gate voltage is withdrawn is adjusted by the resistive elements 437a and 437b so as not to cause the discharge control transistor 14 to break down.

[Steps S434 and S435]

Next, the control unit 37 compares the first gate-source threshold voltage value supplied from the gate-source threshold voltage register 324c and the measured gate-source voltage Vgs. When the gate-source voltage Vgs is higher than the first gate-source threshold voltage (No), the control unit 37 continues execution of step S433. Namely, the switching elements 435a and 435b are kept on. On the other hand, when the gate-source voltage Vgs is lower than the first gate-source threshold voltage (Yes), the control unit 37 turns the switching element 35 on.

In step S435, the gate voltage of the discharge control transistor 14 is withdrawn also through a path via the switching element 35.

Main Effects of the Fourth Embodiment

According to the fourth embodiment, the following effects can be obtained in addition to the effects described in connection with the foregoing embodiments. According to the present embodiment, the control unit 37 turns the switching elements 435a, 435b and 35 on at different timings according to the level of the gate-source voltage Vgs of the discharge control transistor 14 and, thereby, controls in stages the current flowing during voltage withdrawal. In this way, the withdrawal of the gate voltage of the discharge control transistor 14 can be started while the gate-source voltage Vgs of the discharge control transistor 14 is high. This makes it possible to further speed up the turning off of the charge control transistor while maintaining safety.

Also, according to the present embodiment, the resistive element 437a is higher in resistance than the resistive element 437b. In this configuration, it is possible to keep the current flowing during voltage withdrawal small while the gate-source voltage Vgs is high and to gradually increase the current flowing during voltage withdrawal as the gate-source voltage Vgs drops. This makes it possible to start withdrawal of the gate voltage of the discharge control transistor 14 earlier.

The invention made by the present inventors has been concretely described based on embodiments, but the invention is not limited to the embodiments and can be modified in various ways without departing from the scope of the invention.

What is claimed is:

1. A semiconductor device for controlling charging and discharging of a battery cell included in a battery pack, the semiconductor device comprising:
   a boost circuit including an input end coupled via a first node to a positive-side end of the battery pack and an output end coupled via a second node to a gate of a discharge control transistor, wherein the first node is coupled to a source of the discharge control transistor, and wherein a positive-side end of the battery cell is electrically coupled to a drain of the discharge control transistor;
   a switching element including one end coupled to the first node and another end coupled to the second node;
   a first switching element for voltage withdrawal including one end coupled to the first node and another end coupled to a low-voltage power source; and
   a control unit coupled to 1) a gate of the switching element to a gate voltage of the switching element and 2) a gate of the first switching element for voltage withdrawal to control a gate voltage of the first switching element for voltage withdrawal,
   wherein, in discharge stopping processing, the control unit turns the switching element on and executes a first discharge-stopping mode to withdraw a gate voltage of the discharge control transistor via a load coupled to the battery pack,
   wherein, in the first discharge-stopping mode, the control unit:
     calculates a load voltage based on 1) a load current flowing from the load coupled to the battery pack through a current detection resistor and 2) an internal impedance of the load;
     calculates a discharge-stopping mode determination voltage by adding an end voltage at the positive-side end of the battery pack and a load voltage; and
     compares the discharge-stopping mode determination voltage and an element breakdown voltage represented by a gate-source voltage of the discharge control transistor at a time of a breakdown of the discharge control transistor, and
   wherein, when the discharge-stopping mode determination voltage is lower than the element breakdown voltage, the control unit turns the first switching element for voltage withdrawal and switches from the first discharge-stopping mode to a second discharge-stopping mode to withdraw the gate voltage directly to the low-voltage power source.

2. The semiconductor device according to claim 1, wherein, in discharge stopping processing, 1) the switching element short-circuits the first node and the second node and 2) the first switching element for voltage withdrawal short-circuits the first node and the low-voltage power source.

3. The semiconductor device according to claim 1,
   wherein a voltage measurement unit measures the end voltage at the positive-side end of the battery pack, and
   wherein a current measurement unit measures the load current.

4. The semiconductor device according to claim 1, further comprising an internal impedance register for storing a value of the internal impedance,
   wherein the control unit calculates the load voltage based on the internal impedance value stored in the internal impedance register.

5. The semiconductor device according to claim 4,
   wherein the internal impedance register stores plural internal impedance values respectively corresponding to a plurality of the loads, and
   wherein the control unit calculates the load voltage based on the internal impedance value corresponding to the load coupled to the battery pack.

6. A semiconductor device for controlling charging and discharging of a battery cell included in a battery pack, the semiconductor device comprising:
   a boost circuit with an input end coupled via a first node to a positive-side end of the battery pack and an output end coupled via a second node to a gate of a discharge control transistor, wherein the first node is coupled to a source of the discharge control transistor, and wherein a positive-side end of the battery cell is coupled to a drain of the discharge control transistor;
   a switching element including one end coupled to the first node and another end coupled to the second node;
   a first switching element for voltage withdrawal including one end coupled to the first node and another end coupled to a low-voltage power source; and
   a control unit coupled to 1) a gate of the switching element to a gate voltage of the switching element and 2) a gate of the first switching element for voltage withdrawal to control a gate voltage of the first switching element for voltage withdrawal,
   wherein, in discharge stopping processing, the control unit turns the switching element on and executes a first discharge-stopping mode to withdraw a gate voltage of the discharge control transistor via a load coupled to the battery pack, and
   wherein, when a discharge-stopping mode switching time specifying a period of time from when the first discharge-stopping mode is started to when an end voltage at the positive-side end of the battery pack becomes lower than a predetermined end threshold voltage elapses, the control unit turns the first switching element for voltage withdrawal on and switches from the first discharge-stopping mode to a second discharge-stopping mode to withdraw the gate voltage directly to the low-voltage power source.

7. The semiconductor device according to claim 6, further comprising a discharge-stopping mode switching time register for storing the discharge-stopping mode switching time.

8. A battery pack comprising:
a battery cell;
a discharge control transistor, wherein a positive-side end of the battery cell is coupled to a drain of the discharge control transistor;
a boost circuit including an input end coupled to a positive-side end of the battery pack via a first node and an output end coupled to a gate of the discharge control transistor via a second node, wherein the input end is coupled to a source of the discharge control transistor;
a switching element including one end coupled to the first node and another end coupled to the second node;
a first switching element for voltage withdrawal including one end coupled to the first node and another end coupled to a low-voltage power source; and
a control unit coupled to 1) a gate of the switching element to a gate voltage of the switching element and 2) a gate of the first switching element for voltage withdrawal to control a gate voltage of the first switching element for voltage withdrawal,
wherein, in discharge stopping processing, the control unit turns the switching element on and executes a first discharge-stopping mode to withdraw a gate voltage of the discharge control transistor via a load coupled to the battery pack, and
wherein the control unit measures a gate-source voltage of the discharge control transistor based on a gate voltage of the discharge control transistor and an end voltage at the positive-side end of the battery pack, and
wherein, when the gate-source voltage becomes lower than a predetermined first gate-source threshold voltage, the control unit turns the first switching element for voltage withdrawal on and switches from the first discharge-stopping mode to a second discharge-stopping mode to withdraw the gate voltage directly to the low-voltage power source.

9. The battery pack according to claim 8, further comprising a gate voltage measurement unit for measuring the gate voltage of the discharge control transistor.

10. The battery pack according to claim 8, further comprising:
a second switching element for voltage withdrawal; and
a current adjusting resistive element,
wherein one end of the second switching element for voltage withdrawal is coupled to the second node and another end of the second switching element for voltage withdrawal is coupled to one end of the current adjusting resistive element,
wherein another end of the current adjusting resistive element is coupled to the low-voltage power source, and
wherein when the gate-source voltage is lower than a predetermined second gate-source threshold voltage and higher than the predetermined first gate-source threshold voltage, the control unit turns the second switching element for voltage withdrawal on and switches from the first discharge-stopping mode to the second discharge-stopping mode.

11. The battery pack according to claim 10, further comprising:
a plurality of the second switching elements for voltage withdrawal; and
a plurality of the current adjusting resistive elements corresponding to the second switching elements for voltage withdrawal,
wherein, in the second discharge-stopping mode, the control unit turns the second switching elements for voltage withdrawal on at different timings according to a level of the gate-source voltage.

12. The battery pack according to claim 11, wherein the current adjusting resistive elements corresponding to the second switching elements for voltage withdrawal that turn on when the gate-source voltage is at a high level are higher in resistance than the second switching elements for voltage withdrawal that turn on when the gate-source voltage is at a low level.

* * * * *